United States Patent
Pythoud

(10) Patent No.: US 7,388,945 B2
(45) Date of Patent: Jun. 17, 2008

(54) METHOD AND SYSTEM FOR DETERMINING DATA TRANSFER MARGINS FOR NETWORK CONNECTIONS

(75) Inventor: Frederic Pythoud, Fribourg (CH)

(73) Assignee: Swisscom Fixnet AG, Bern (NL)

( * ) Notice: Subject to any disclaimer, the term of this patent is extended or adjusted under 35 U.S.C. 154(b) by 790 days.

(21) Appl. No.: 10/495,826

(22) PCT Filed: Nov. 15, 2001

(86) PCT No.: PCT/CH01/00673

§ 371 (c)(1),
(2), (4) Date: Oct. 28, 2004

(87) PCT Pub. No.: WO03/043257

PCT Pub. Date: May 22, 2003

(65) Prior Publication Data

US 2005/0078744 A1 Apr. 14, 2005

(51) Int. Cl.
*H04M 1/24* (2006.01)
*H04M 3/08* (2006.01)
*H04M 3/22* (2006.01)

(52) U.S. Cl. ............... 379/1.03; 379/1.04; 379/28; 379/29.09

(58) Field of Classification Search ........... 379/1.01, 379/1.03, 1.04, 22.08, 23, 24, 27.08, 28, 379/29.05, 29.09, 30; 370/241, 241.1, 247, 370/252; 375/224, 225, 227, 265
See application file for complete search history.

(56) References Cited

U.S. PATENT DOCUMENTS 7,027,405 B1 * 4/2006 Khadavi ............... 370/244
7,263,174 B2 * 8/2007 Schmidt et al. ......... 379/1.04
2005/0041799 A1 * 2/2005 Pythoud et al. ......... 379/400

FOREIGN PATENT DOCUMENTS

EP          0 905 948          3/1999

OTHER PUBLICATIONS

"Transmission and Multiplexing (TM); Access networks; Spectral management on metallic access networks; Part 1: Definitions and signal library", European Telecommunications Standards Institute, ETSI TR 101 830-1, pp. 1-85, XP002212697 Aug. 2001.

* cited by examiner

*Primary Examiner*—Quoc Tran
(74) *Attorney, Agent, or Firm*—Oblon, Spivak, McClelland, Maier & Neustadt, P.C.

(57) ABSTRACT

Method and system for determining data transfer margins and/or bit rates for network connections, the physical length of a network connection between a transmitter and receiver being known. A power spectrum is measured depending upon transfer frequency for possible modem types. Attenuation, and thus actual signal strength, is determined for different physical lengths and cable wire thicknesses of the network connection. Noise level is determined at least depending upon crosstalk parameters, number of interference sources, and equalizer factors based on the power spectrum. The data transfer margins are determined for different data transmission modulations and/or modulation codings for a pre-defined bit rate, based on the actual signal strengths and corresponding noise levels, by a Gaussian transformation module. The data transfer margins are corrected by a correction factor containing average deviation of the stored data transfer margin with respect to the actual data transfer margin. The data transfer margin for the network connection is determined based on the stored actual data transfer margins with reference to the known physical length.

17 Claims, 3 Drawing Sheets

METHOD AND SYSTEM FOR DETERMINING DATA TRANSFER MARGINS FOR NETWORK CONNECTIONS

The present invention relates to a method and system for determining data transfer margins for network connections, in which method and system the physical length of a network connection between a transmitter and a receiver is known. In particular the method relates to networks based on copper wire connections.

Traditional telephone network services, also called POTS (Plain Old Telephone Service), usually connect households and smaller enterprises to a distribution station of the telephone network operator via copper wires which are wrapped around each other and are called twisted pairs. These were originally intended for ensuring analog signals, in particular sound and voice transmissions. These requirements have however changed, at the latest with the emergence of the Internet and the data flow connected therewith, and are rapidly changing once again today, owing to the need to be able to work at home and/or in the office with real time and multimedia applications.

Data networks, such as e.g. Intranet and Internet, rely heavily on so-called shared media, i.e. on packet-oriented LAN (Local Area Network) or WAN (Wide Area Network) technologies both for broadband backbone between switches and gates and for local network connections with smaller bandwidths. Use of packet manager systems, such as e.g. bridges or routers, are widespread for connecting the local LAN networks to the Internet. An Internet router must thereby be capable of transmitting packets accordingly, based on the most varied protocols, such as e.g. IP (Internet Protocol), IPX (Internet Packet exchange), DECNET, AppleTALK, OSI (Open System Interconnection), SNA (IBM's Systems Network Architecture) etc. The complexity of such networks, in order to be able to distribute the packets worldwide, is a challenge both for the vendor of services (provider) and for the manufacturer of the necessary hardware.

The ordinary LAN systems work relatively well with data transfer rates of about 100 Mbps. With transfer rates above 100 Mbps, the resources of the network manager, such as packet switches, do not suffice in most of today's networks for administering the allocation of bandwidths and of user access. Of course the usefulness of packet-based networks for transmission of digital information, in particular with short-term transmission peaks, was recognized long ago. Such networks usually have point-to-point structure, a packet being transmitted from a single transmitter to a single receiver in that each packet comprises at least the destination address. A typical example of this is the known header of an IP data packet. The network reacts to the data packet by routing the packet to the address of the assigned header. Packet-based networks can also be used for transmitting data types requiring a continuous data flow, such as e.g. sound and audio transmissions of high quality or video transmissions. The commercial use of networks makes it particularly desirable for packet-based transmission to be also possible simultaneously to a plurality of end points. An example of this is the so-called packet broadcasting for transmission of video or audio data. So-called pay TV can thereby be achieved, i.e. broadcast transmission, liable to charges, of video data over the network.

With the next generation of applications, such as real-time and multimedia applications with their much bigger requirement with respect to bandwidth, which must be guaranteed moreover at any time, the packet-oriented networks meet their limits, however. Thus a next generation of networks should possess the possibility of reconfiguring the networks dynamically in order to be able to always guarantee the user a predefined bandwidth for requested or agreed-upon QoS Parameters (Quality of Service). These QoS comprise e.g. access guarantee, access performance, fault tolerance, data security, etc. between all possible end systems. New technologies, such as e.g. ATM (Asynchronous Transfer Mode), should help to create in the long-term development of the networks the necessary prerequisites for the private Intranet as well as the public Internet. These technologies promise a more economical and more scalable solution for such high performance connections guaranteed by means of QoS parameters.

One change for future systems will also relate in particular to the data flow. The data flow today is usually based on a server-client model, i.e. data are transmitted from many clients to or from one or more network servers. The clients create normally no direct data connection, but instead they communicate with each other via network servers. This type of connection will also continue to have its significance. Nevertheless it is to be expected that the quantity of data which is transmitted peer-to-peer will increase sharply in the future since, in order to meet the demands, the ultimate goal of the networks will be a truly decentralized structure in which all systems are able to act both as server and as client. Thus the network will have to generate more direct connections to the different peers, whereby e.g. desktop computers will be connected directly via the backbone Internet.

It is therefore clear that in future applications it will become more and more important for the user to be able to be guaranteed predeterminable QoS parameters and large bandwidths.

Used for data transmission to the end user are in particular the traditional public telephone network (PSTN: Public Switched Telephone Network) and/or PLMN (Public Land Mobile Network), which were actually designed originally for pure sound transmission, and not for transmission of such quantities of digital data. The so-called "last mile" plays a decisive role thereby in the determination of the QoS parameters which a provider or vendor of telephone services is able to guarantee the user. Designated as the last mile is the stretch between the last distribution station of the public telephone network and the end user. In the fewest cases the last mile consists of high-capacity fiber optic cables. It is usually based rather on the ordinary copper wire cabling, such as e.g. cable with 0.4 or 0.6 mm wire diameter. The cables moreover are not run everywhere underground in protected ground conducting construction, but also consist of overland lines to telephone masts, among other things. Additional disturbances thereby arise.

A further problem in determining the maximal QoS parameters is the so-called crosstalk problem. This problem arises with the modulation of the signal on the line e.g. from the end user to the distribution station of the telephone network operator and vice-versa. Known in the state of the art for modulation of digital signals are e.g. the xDSL technologies (Digital Subscriber Line), such as ADSL (Asymmetric Digital Subscriber Line), SDSL (Symmetric Digital Subscriber Line), HDSL (High-data-rate DSL) or VDSL (Very high speed Digital Subscriber Line). The mentioned crosstalk is the physical phenomenon which arises during the modulation of data via a copper cable. By way of electromagnetic interaction, adjacent copper wires inside a copper cable obtain partial signals pairwise which are generated by the modem. This results in xDSL modems, carried on adjacent wires, interfering with one another. A distinction is made between Near End Crosstalk (Next), which characterizes the undesired signal coupling of signals of the transmitter at one end to the signals of the receiver at the same end, and Far End Crosstalk (FEXT), which characterizes the undesired signal coupling of signals during the transmission to the receiver at the other end, the signals during the transmission being coupled to signals of adjacent copper wire pairs and showing up as noise at the receiver.

Although many studies on xDSL crosstalk are available today, such as e.g. "Spectral management on metallic access networks; Part 1: Definitions and signal library", ETSI (European Telecommunications Standards Institute), TR 101 830, September 2000, there are at the present time few usable, technically easy-to-handle and cost-efficient aids for determining the QoS parameters for a particular end user in the network, owing to the complexity of the crosstalk phenomenon and of the remaining noise parameters. In the state of the art, remote measuring systems have been proposed by various companies, such as e.g. Acterna (WG SLK-11/12/22, Eningen, among others, Germany), Trend Communications (LT2000 Line Tester, www.trendcomms.com, Buckinghamshire, U.K.) etc. The maximal transfer rate over the last mile is thereby determined through direct measurements by means of remote measuring systems: a digital signal processor is installed at each local distribution station of a telephone network operator (e.g. in Switzerland several thousand). By means of the digital signal processor a so-called "single ended measurement" is carried out since no installations of devices are necessary at the user on the other side of the last mile. The measurements are also possible, in principle, by means of "double ended measurement." Installation of measuring devices at both ends of the line are thereby necessary, however.

The drawbacks of the state of the art are, among other things, high costs from the required installation of remote measuring systems at every local distribution station and a imprecisely known incertitude or respectively unknown error during the measurement since the measurements are carried out only on one side (single ended) and measurements on both sides would be needed to determine the error. A two-sided measurement would not be feasible in view of the investment in personnel and in time as well the in costs. Also lacking in the state of the art are algorithms with their hardware or software implementation for calculation, or respectively prediction, of the maximal possible bit rates of a network connection. An installation of the remote measuring systems at the less numerous central distribution stations instead of at the local end distribution stations shows that the measurements entail such great uncertainties that they are not suitable for determining the maximal possible data throughput rates for a particular line to an end user.

It is an object of this invention to propose a new method, system and computer program product for determining data transfer margins for network connections which does <sic. do> not have the drawbacks described above. In particular the margins and/or the maximal bit rates for a particular user or respectively network point of access should be able to be determined quickly and flexibly without a disproportional technical, personnel and financial investment having to be made.

This object is achieved according to the present invention in particular through the elements of the independent claims. Further preferred embodiments follow moreover from the dependent claims and from the description.

In particular these objects are achieved through the invention in that, for determining data transfer margins for network connections, the physical length of a network connection to be determined between a transmitter and a receiver being known, a power spectrum is measured by means of a power measuring device in dependence upon the transfer frequency for possible modem types and is transmitted onto a data carrier <of> a calculating unit, in that with the calculating unit the attenuation is determined for different physical lengths and cable wire thicknesses of a network connection, and the actual signal strengths at the receiver, based on the attenuation as well as the power spectrum, are stored, assigned to the respective physical lengths and cable wire thicknesses (i.e. the wire diameters in the cable), in a first list on a data carrier of the calculating unit, in that in a second list the noise level is stored, assigned to the respective physical lengths and cable wire thicknesses of the network connection, on a data carrier of the calculating unit, the noise level being determined by means of the calculating unit, on the basis of the power spectrum, depending upon at least crosstalk parameters and number of interference sources, in that, by means of a Gaussian transformation module, the calculating unit determines data transfer margins for a predefined bit rate based on the actual signal strengths of the first and the corresponding noise level of the second list for different data transmission modulations and/or modulation codings, and stores them, assigned to the respective physical lengths and cable wire thicknesses of the network connection, on a data carrier of the calculating unit, in that the calculating unit determines, based on the stored data transfer margins, the actual data transfer margins, by means of at least one or more correction factors, and stores them, assigned to the respective physical lengths and cable wire thicknesses of the network connection, on a data carrier of the calculating unit, the correction factor comprising an average deviation of the stored data transfer margins with respect to the actual data transfer margins and/or an equalizer factor for correction of the equalizer adjustment, and in that, based on the stored actual data transfer margins, with reference to the known physical length of the network connection to be determined between the transmitter and the receiver, the calculating unit determines the data transfer margin for the respective network connection.

One advantage of the invention is, among other things, that the method and system permits for the first time a simple and quick determination of data transfer margins, without having to thereby engage in an immense technical investment, investment with respect to personnel and investment with respect to time. In particular, the uncertainties can be corrected by means of the mentioned correction, without, as with the remote measuring systems for measuring the data transfer margins and/or the bit rates, a different imprecisely known uncertainty at each local distribution station, or respectively unknown errors in measurement having to be corrected, which error is difficult to estimate owing to the single-endedness since measurements on both sides would be necessary for determining the error. As described above, the investment remains small, compared to the state of the art. This applies both to carrying out the measurement and to installing the necessary devices.

In an embodiment variant, the power spectrum is measured in dependence upon the transmission frequency for ADSL- and/or SDSL- and/or HDSL- and/or and/or <sic.> VDSL- modem types. The possible SDSL modem types can thereby comprise at least one G.991.2 modem type and/or the ADSL modem types at least one G.992.2 modem type. By means of the Gaussian transformation module, the data transfer margins can be determined for at least the data transmission modulations 2B1Q (2 Binary, 1 Quaternary) and/or CAP (Carrierless Amplitude/Phase Modulation) and/or DMT (Discrete Multitone) and/or PAM (Pulse Amplitude Modulation). Also by means of the Gaussian transformation module, the data transfer margins can be determined for at least the trellis modulation coding. This embodiment variant has, among other things, the advantage that with the xDSL modem types, the mentioned data transmission modulations and the trellis modulation coding, common standard technologies are used which are easily obtainable on the market and whose use are <sic. is> widespread both in Europe and also in the USA.

In another embodiment variant, the correction factor reflects a non-linear dependency with respect to the physical lengths and/or cable wire thicknesses, i.e. the correction factor can be represented by a non-linear function, e.g. a polynomial function of an order higher than 1. This embodiment variant has the advantage, among other things, that much more complex dependencies can be taken into account and corrected with it than with linear correction factors.

An again different embodiment variant comprises a computer program product, which can be loaded directly into the internal memory of a digital computer and comprises software code sections with which the steps according to the preceding embodiment variants can be carried out when the product runs on a computer. This embodiment variant has the advantage that it makes possible a technical achievement of the invention which is simple to manage and use without big installations.

In particular, for determining bit rates for network connections, the physical length of a network connection between a transmitter and a receiver being known, a power spectrum is measured by means of a power measuring device in dependence upon the transfer frequency for possible modem types, and is transmitted onto a data carrier of a calculating unit;

with the calculating unit the attenuation is determined for different physical lengths and cable wire thicknesses of a network connection, and the actual signal strengths at the receiver, based on the attenuation as well as the power spectrum, are stored, assigned to the respective physical lengths and cable wire thicknesses, in a first list on a data carrier of the calculating unit;

in a second list, the noise level is stored, assigned to the respective physical lengths and cable wire thicknesses of the network connection, on a data carrier of the calculating unit, the noise level being determined on the basis of the power spectrum by means of the calculating unit depending upon at least crosstalk parameters and number of interference sources;

by means of a Gaussian transformation module, based on the actual signal strengths of the first and the corresponding noise level of the second list for different data transmission modulations and/or modulation codings, the calculating unit determines the bit rates for a predefined data transfer margin, and stores the bit rates, assigned to the respective physical lengths and cable wire thicknesses of the network connection, on a data carrier of the calculating unit;

the calculating unit determines, based on the stored bit rates, the actual bit rates by means of one or more correction factors, and stores the actual bit rates, assigned to the respective physical lengths and cable wire thicknesses of the network connection, on a data carrier of the calculating unit, the correction factor comprising the average deviation of the stored bit rates with respect to the actual bit rates and/or an equalizer factor for correction of the equalizer adjustment;

and based on the stored actual bit rates, with reference to the known physical length of the network connection to be determined between the transmitter and the receiver, the calculating unit determines the bit rate for the respective network connection. This embodiment variant has, among other things, the advantage that the method and system permits for the first time a simple and quick determination of the bit rates, without having to thereby engage in an immense technical investment, investment with respect to personnel and investment with respect to time. In particular, the uncertainties can be corrected by means of the mentioned correction, without, as with the remote measuring systems for measuring the data transfer margins and/or the bit rates, a different imprecisely known uncertainty at each local distribution station, or respectively unknown errors in measurement having to be corrected, which errors are difficult to estimate owing to the single-endedness since measurements on both sides would be necessary for determining the error.

In an embodiment variant, the power spectrum is measured in dependence upon the transmission frequency for ADSL and/or SDSL and/or HDSL and/or and/or <sic . . .> VDSL modem types. The possible SDSL modem types can thereby comprise at least one G.991.2 modem type and/or the ADSL modem types at least one G.992.2 modem type. By means of the Gaussian transformation module, the data transfer margins can be determined for at least the data transmission modulations 2B1Q and/or CAP and/or DMT and/or PAM. Also by means of the Gaussian transformation module, the data transfer margins can be determined for at least the trellis modulation coding. This embodiment variant has, among other things, the advantage that with the xDSL modem types, the mentioned data transmission modulations and the trellis modulation coding, common standard technologies are used which are easily obtainable on the market and whose use are <sic. is> widespread both in Europe and also in the USA.

In another embodiment variant, the correction factor comprises a non-linear dependency with respect to the physical lengths and/or cable wire thicknesses, i.e. the correction factor can be represented by a non-linear function, e.g. a polynomial function of an order higher than 1. This embodiment variant has the advantage, among other things, that much more complex dependencies can be taken into account and corrected than with linear correction factors.

In a further embodiment variant, by means of the Gaussian transformation module, the bit rates are determined for data transfer margins between 3 and 9 dB. This embodiment variant has the advantage, among other things, that the range between 3 and 9 dB allows reception with QoS parameters satisfying most demands. In particular the range of the data transfer margins between 3 and 9 dB permits an optimization of the bit rates with respect to the other QoS parameters.

In a further embodiment variant, by means of the Gaussian transformation module, the bit rates for a 6 dB data transfer margin are determined. This embodiment variant has, among other things, the same advantages as the preceding embodiment variant. In particular, as above, a data transfer margin of 6 dB permits an optimization of the bit rate with respect to the other QoS parameters.

An again different embodiment variant comprises a computer program product, which can be loaded directly into the internal memory of a digital computer, and comprises software code sections with which the steps according to the preceding embodiment variants can be carried out when the product runs on a computer. This embodiment variant has the advantage that it makes possible a technical achievement of the invention which is simple to manage and use without big installations.

It should be stated here that, besides the method according to the invention, the present invention also relates to a system and a computer program product for carrying out this method.

Embodiment variants of the present invention will be described in the following with reference to examples. The examples of the embodiments are illustrated by the following attached figures:

FIG. 1 shows a block diagram, showing schematically the architecture of an embodiment variant of a system according to the invention for determining data transfer margins or respectively bit rates for a network connection 12 with a predetermined physical length 13 between a transmitter 10 and a receiver 11.

FIG. 2 shows schematically a crosstalk interaction with near-end crosstalk (Next) 51, which describes the undesired coupling of the signal 50 of the transmitter 10 at one end to the signals 50 at the receiver 11 at the same end, and far-end crosstalk (FEXT) 52, which describes the undesired coupling of signals 50 during the transmission to the receiver 11 at the other end, the signals 50 being coupled during the transmission to signals 50 of adjacent copper wire pairs and turning up at the receiver 11 as noise.

Figure 1:
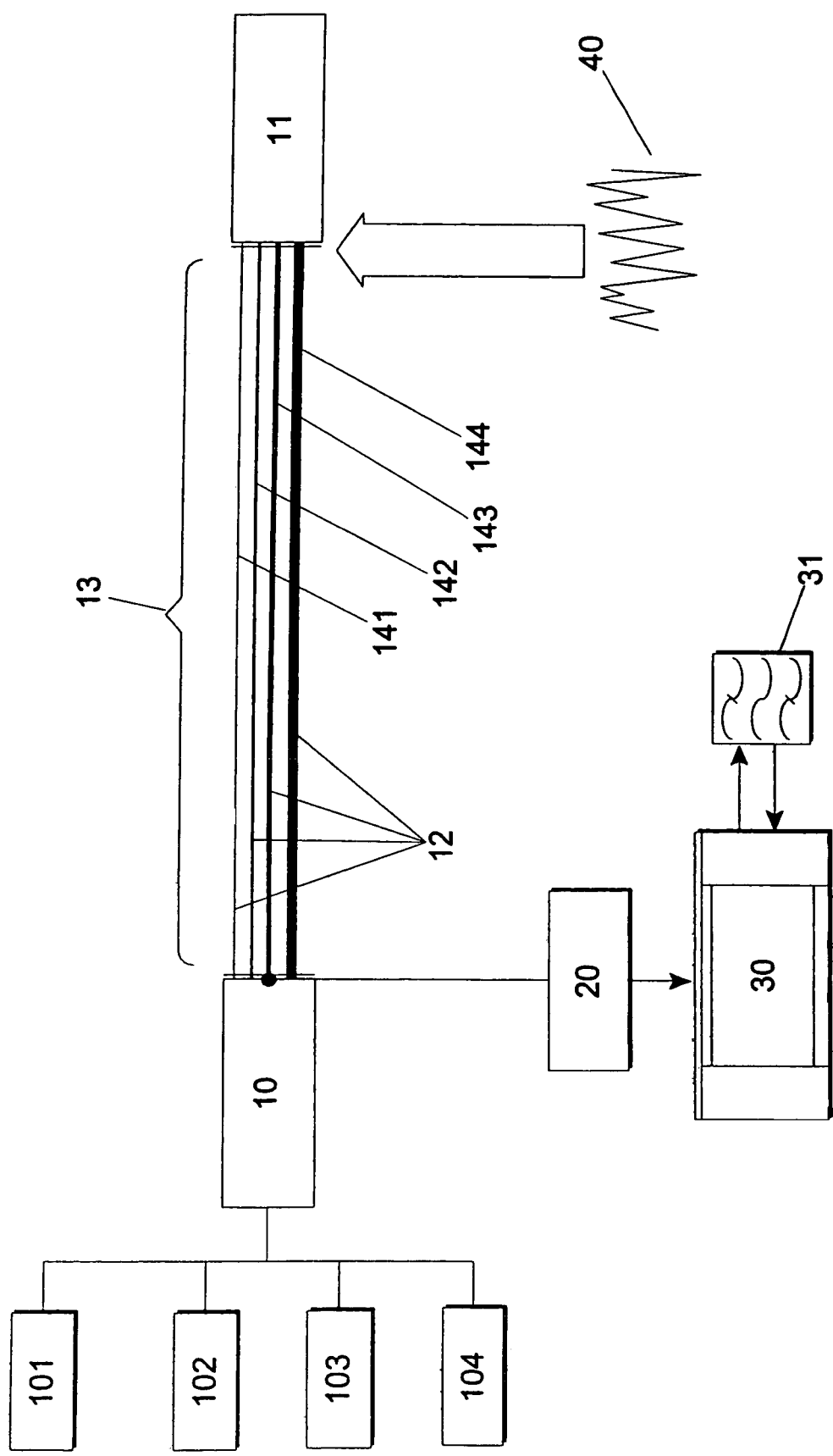
Figure 2:
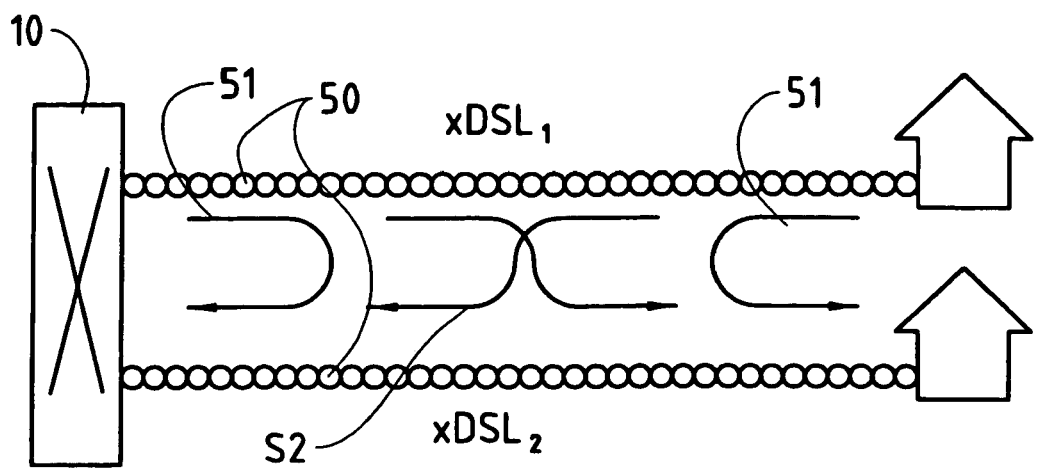
Figure 4:
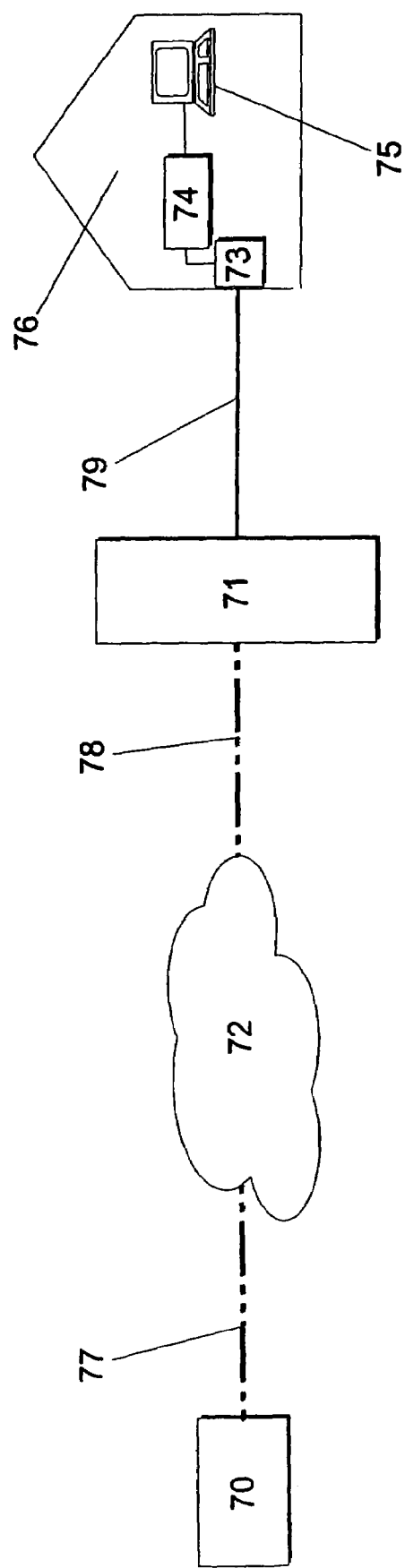
FIG. 4 shows schematically the so-called last mile of the public telephone network (PSTN: Public Switched Telephone Network), as exists typically between the end user at home and a network which is supposed to be reached via the public telephone network.

FIG. 1 illustrates an architecture which can be used to achieve the invention. In this embodiment example for the method and the system for determining data transfer margins and/or bit rates for network connections, the physical length 13 of a network connection 12 to be determined between a transmitter 10 and a receiver 11 is known. Meant by the physical length is the actual cable length, i.e. not e.g. the distance by air, between the transmitter 10 and the receiver 11. The network connection 12 should consist of an analog medium, such as e.g. a copper wire cabling. Used in this embodiment examples were, for instance, copper cable with 0.4 or 0.6 mm wire diameter, as is typically used in the last mile of the public telephone network (PSTN: Public Switched Telephone Network). The last mile is shown schematically in FIG. 4. The reference numeral 70 thereby designates a router to a network, which is connected via e.g. a 10 BT Ethernet 77 and the public telephone network (PSTN) 72 to a server 71 with a modem terminal. The modem terminal server 71 <can> be a DSL Access Multiplexer (DSLAM). As mentioned, the reference numeral 72 is the public telephone network (PSTN), to which the modem terminal server 71 is connected, for instance via a fiber optic cable 78. Furthermore the public telephone network 79 <sic. 72> or respectively the modem terminal server 71 is connected typically via a copper wire cable 79 and via the telephone box 73 to a modem 74 of a personal computer (PC) 75. The reference numeral 79 is thereby the mentioned so-called "last mile" from the distribution station of the telephone network operator to the end user. The end user 76 can thereby access the router 70 directly with his PC by means of the described connection. The common telephone lines of copper can consist e.g. of 2-2400 pairs of copper wires. Other analog media, in particular copper cable with e.g. other wire diameters, are also conceivable, however. It must be explicitly pointed out that not only can the network connections 12 each have different diameters or thicknesses 114, 142, 143, 144, but an individual network connection can consist of a combination of cables with different wire diameters or thicknesses, i.e. the network connection can comprise a plurality of sections of cables with different wire thickness.

A power spectrum $PSD_{Modem}(f)$ is measured in dependence upon the transmission frequency $f$ for possible modem types 101, 102, 103, 104 by means of power measuring device 20, and is transmitted onto a data carrier of a calculating unit 30. The power spectrum is also designated as the Power Spectral Density (PSD), and reflects, for a particular bandwidth of a continuous frequency spectrum, the total energy of the particular frequency bandwidth divided by the particular bandwidth. The division by the bandwidth corresponds to a scaling. The PSD is thus a function in dependence upon the frequency $f$, and is normally indicated in watt per hertz. For power measurement by means of power measuring device 20 at the receiver 11, a simple A/D converter can be used, for instance, the voltage being applied via a resistor. For modulation of digital signals to the line 12 e.g. from end user to the distribution station of the telephone network operator and vice-versa, the most various types of modem can be used. Known in the state of the art are e.g. the xDSL technologies (Digital Subscriber Line), the two main representatives of which are ADSL (Asymmetric Digital Subscriber Line) and SDSL (Symmetric Digital Subscriber Line). Further representatives of the xDSL technology are HDSL (High-data-rate DSL) and VDSL (Very high speed Digital Subscriber Line). The xDSL technologies are highly developed modulation schemes for modulating data on copper lines or other analog media. xDSL technologies are sometimes also referred to as "last mile technologies," precisely because they usually serve the purpose of connecting the last telephone network distribution station to the end user at the office or at home, and are not used between the individual telephone network distribution stations. xDSL is similar to ISDN (Integrated Services Digital Network) insofar as it can operate over the existing copper lines, and both require a relatively short distance to the next distribution station of the telephone network operator. xDSL offers however much higher transmission rates than ISDN. xDSL reaches data transmission rates of up to 32 Mbps (bps: bits per second) downstream rate (transmission rate during reception of data, i.e. during the modulation) and of 32 kbps to 6 Mbps upstream rate (transmission rate during transmission of data, i.e. during the demodulation), whereas ISDN per channel supports data transmission rates of 64 kbps. ADSL is a technology which has become very popular recently for modulating data over copper lines. ADSL supports data transmission rates of 0 to 9 Mbps downstream rate and 0 to 800 kbps upstream rate. ADSL means asymmetrical DSL, since it supports different downstream and upstream rates. SDSL or symmetrical DSL is called symmetrical, on the other hand, because it supports the same downstream and upstream rates. SDSL permits transmission of data up to 2.3 Mbps. ADSL transmits digital impulses in a high frequency region of the copper cable. Since these high frequencies are not used in normal sound transmission in the acoustic range, (e.g. voices), ADSL can work at the same time, for instance, to transmit telephone conversations over the same copper cables. ADSL is widespread in North America, while SDSL was developed above all in Europe. ADSL as well as SDSL require modems especially equipped therefor. HDSL is a representative of symmetrical DSL (SDSL). The standard for symmetrical HDSL (SDSL) is at present G.SHDSL, known as G.991.2, as developed as an international standard of the CCITT (Comité Consulatif International Téléphonique et Télégraphique) of the ITU (International Telecommunication Union). G.991.2 supports the reception and transmission of symmetrical data streams over a simple copper wire pair with transfer rates between 192 kbps and 2.31 Mbps. G.991.2 was developed such that it comprises the features of ADSL and SDSL, and supports standard protocols such as IP (Internet Protocol), in particular the current versions IPv4 and IPv6 or IPng of the IETF (Internet Engineering Task Force) as well as TCP/IP (Transport Control Protocol), ATM (Asynchronous Transfer Mode), T1, E1 and ISDN. To be mentioned here as the last of the xDSL technologies is VDSL (Very high speed Digital Subscriber Line). VDSL transmits data in the range of 13-55 Mbps over short distances (usually between 300-1500 m) via twisted pair copper cable. With VDSL it applies that the shorter the distance, the higher the transmission rate. As the final part of a network, VDSL connects the office or the home of a user to an adjacent optical network unit, called Optical Network Unit (ONU), which is typically connected to the main optical fiber network (Backbone), for instance of a company. VDSL allows the user access to the network with maximal bandwidth via normal telephone lines. The VDSL standard has not yet been fully established. Thus there are VDSL technologies having a Line Coding Schema based on DMT (Discrete Multitone), DMT being a Multi-Carrier System having great similarity to the ADSL technology. Other VDSL technologies have a Line Coding Schema based on Quadrature Amplitude Modulation (QAM), which, in contrast to DMT, is cheaper, and requires less energy. For this embodiment example the modem types can comprise ADSL and/or SDSL and/or HDSL and/or and/or <sic.> VDSL modem types (101, 102, 103, 104). In particular the possible SDSL modem types (101, 102, 103, 104) can include at least one G.991.2 modem type and/or the ADSL modem types (101, 102, 103, 104) at least one G.992.2 modem type. It is clear, however, that this enumeration is not supposed to apply in any limiting way to the scope of protection of the invention, but that, on the contrary, other modem types are conceivable.

With the calculating unit 30, the attenuation H is determined for different physical lengths 13 and core thicknesses of the cable 141, 142, 143, 144, such as e.g. 0.4 mm and 0.6 mm, of a network connection 12, and the actual signal strengths $S(f)$ at the receiver 11, based on the attenuation $H(f)$ as well as the power spectrum $PSD(f)$, are stored, assigned to the respective physical lengths L 13 and cable wire thicknesses D 141, 142, 143, 144, in a first list on a data carrier of the calculating unit 30. Like the actual signal strength $S(f)$, the attenuation $H(f,L,D)$ is thereby a function in dependence upon the frequency $f$. The signal sent from the transmitter 10 is thus $PSD_{Modem}(f)$, while at the receiver an actual signal strength $S(f)=PSD_{Modem}(f)H^2(f,L,D)$ is still obtained. In a second list, the noise level $N(f)$ 40 is stored, assigned to the respective physical lengths 13 and cable wire thicknesses 141, 142, 143, 144 of the network connection 12, on a data carrier of the calculating unit 30, the noise level $N(f)$ 40 being determined, based on the power spectrum PSD, by means of the calculating unit 30, in dependence upon at least crosstalk parameters Xtalk type and number of interference sources A. I.e.

$$N(f) = \sum_{i, Xtalktype} PSD_{SModem(i)}(f) Hxp(f, L, Xtalktype, A_i)$$

The sum, with the index i, runs over all unwanted modulations (SModem) in dependence upon their Xtalk type, which act on parallel connections of the network connection. $PSD_{sModem(i)}$ is the power spectrum of the $i^{th}$ Smodem. Hxp is the attenuation in dependence upon the crosstalk. As mentioned, the crosstalk problem is the physical phenomenon occurring with modulation of data over a copper cable. Adjacent copper cable wires inside a copper cable obtain, by way of electromagnetic interaction, partial signals pairwise which are generated by modems. This leads to xDSL modems, which are carried assigned on adjacent wires, interfering with one another. Crosstalk as the physical effect is almost negligible for ISDN (frequency range up to 120 kHz), but becomes important however for e.g. ADSL (frequency range up to 1 MHz) and becomes a decisive factor for VDSL (frequency range up to 12 MHz). As described, the conventional telephone copper lines consist of 2 to 2400 copper wires. In order to be able to use four pairs, for example, the data stream at the transmitter is divided up into a multiplicity of parallel data streams and recombined again at the receiver, which increases the actual data throughput by a factor of 4. This would permit a data transmission with up to 100 Mbps. In addition, in the case of 4 pairs of copper wires, the same four pairs of wire could be used to transport the same quantity of data simultaneously in the opposite direction. The bidirectional data transmission over each pair of copper wire doubles the information capacity which can be transmitted. This increases in this case the data transmission rate by eight times compared to conventional transmissions, in which two pairs are used for one direction in each case. For data transmission as described above, crosstalk noise is a greatly limiting factor. As crosstalk types a distinction is made between near-end crosstalk (Next) 51, which describes the undesired coupling of the signal 50 of the transmitter 10 at one end to the signals 50 at the receiver 11 at the same end, and far-end crosstalk (FEXT) 52, which describes the undesired coupling of signals 50 during the transmission to the receiver 11 at the other end, the signals 50 being coupled during the transmission to signals 50 of adjacent copper wire pairs and turning up at the receiver 11 as noise (see FIG. 1). Normally it is assumed that NEXT 51 has only one near-end interference source. Xtalk type is thus dependent upon the location and the stream (up/down), i.e. Xtalk type (stream, location). If there are more than two copper wires, which is usually the case (typically there are between 2 and 2400 wires), then the pairwise coupling described above is no longer true. E.g. for the case where four pairs of wire are used at the same time, there are consequently now three unwanted interference sources which couple with their energy to the signal 50. For A, A=3 applies in this case. The same applies for FEXT crosstalk 52.

By means of a Gaussian transformation module 31, the calculating unit 30 determines the data transfer margins based on the actual signal strength strengths $S(f)$ of the first and the corresponding noise level $R(f)$ of the second list for different data transmission modulations and/or modulation codings for a predefined bit rate, and stores the data transfer margins, assigned to the respective physical lengths 13 and cable wire thicknesses 141, 142, 143, 144 of the network connection 12, on a data carrier of the calculating unit 30. With the actual signal strengths $S(f)$ of the first list and the noise level N(f), the signal S to noise R <sic. N> ratio SNR (Signal to Noise Ratio) can be calculated by means of the calculating unit 30, whereby:

$$SNR \cong \exp\left(T \int_{-1/2T}^{1/2T} \ln\left(\frac{\sum_n |S(f+n/T)|^2}{\sum_n N(f+n/T)}\right) df\right)$$

This formula applies only for CAP, 2B1Q and PAM modulation, not however for DMT modulation. DMT will be described more closely further below. T is thereby the symbol interval or half the inverse of the Nyquist frequency. The Nyquist frequency is the highest possible frequency that can still be sampled precisely. The Nyquist frequency is half the sampling frequency, since unwanted frequencies are generated when a signal is sampled whose frequency is higher than half the sampling frequency n is the summing up index. In practice it normally suffices for n to run from −1 to 1. If this does not suffice, further maxima 0, ±1/T, ±2/T etc. can be included until the desired precision is reached. The data transfer margins depend upon the data transmission modulations and/or modulation codings, as has been mentioned further above. In this embodiment example we shall show the dependency, for instance, for HDSL modems 2B1Q modulation (2 Binary, 1 Quaternary) and CAP modulation (Carrierless Amplitude/Phase Modulation) as an example for ADSL DMT modulation (Discrete Multitone Technology) and with respect to the modulation codings for trellis-coded signals. However, it is also clear that the method and system according to the invention also applies, without further ado, to other data transmission modulations and/or modulation codings such as e.g. PAM (Pulse Amplitude Modulation) etc. 2B1Q modulation as well as CAP modulation is used with HDSL modems, and has a predefined bit rate. DMT modulation is used with ADSL modems, and has, on the other hand, a variable bit rate. CAP and DMT have used the same fundamental modulation technology: QAM (Quadrature Amplitude Modulation), although this technology is employed differently. QAM makes it possible for two digital carrier signals to occupy the same transmission bandwidth. Two independent so-called message signals are thereby used to modulate two carrier signals having an identical frequency, but differing in amplitude and phase. QAM receivers can distinguish whether a low or a high number of amplitude and phase states are required in order to obviate noise and interference e.g. on a copper wire pair. 2B1Q modulation is also known as "4 Level Pulse Amplitude Modulation" (PAM). It uses two volt levels for the signal pulse and not, such as e.g. AMI (Alternate Mark Insertion), one level. Since positive and negative level distinction is also made, one obtains a 4 level signal. The bits are combined finally into twos in each case, which pairs each correspond to a volt level (therefore 2 bit). The required signal frequency for transmitting the same bit rate, as with bipolar AMI, is thereby halved with 2B1Q. With HDSL modem with 2B1Q or CAP modulation, there exists the following dependency of the data transfer margins with respect to the SNR:

$$M_c = SNR/\xi$$

whereby $\xi$ can be determined as a function of the error rate (Symbol Error Rate) $\epsilon_s$. For LAN (IP) an error rate of $\epsilon_s=10^{-7}$ usually suffices, i.e. each $10^7$ bit is wrongly transmitted on the average. Companies typically require a $\epsilon^s=10^{-12}$ for their company networks. If, for instance, the $\epsilon_s$ approaches the order of magnitude of the data packet size transmitted (e.g. $10^{-3}$), that would mean conversely that each packet has to be transmitted twice on the average until it arrive correctly. For the 2B1Q modulation there applies for $\epsilon_s$ for example:

$$\varepsilon_s = 2\left(1 - \frac{1}{M}\right) \cdot G_c\left(\sqrt{\frac{3*\xi}{M^2-1}}\right)$$

for uncoded signals and $$\varepsilon_s = 2\left(1 - \frac{1}{M/2}\right) \cdot G_c\left(\sqrt{\frac{3*\xi*10^{0.4}}{(M/2)^2-1}}\right)$$

for trellis-coded signals, while for the CAP modulation there applies:

$$\varepsilon_s = 4\left(1 - \frac{1}{M}\right) \cdot G_c\left(\sqrt{\frac{3\xi}{M^2-1}}\right)$$

for uncoded signals and $$\varepsilon_s = 4\left(1 - \frac{1}{M/\sqrt{2}}\right) \cdot G_c\left(\sqrt{\frac{3(\xi 10^{0.4})}{M^2/2-1}}\right)$$

for trellis-coded signals. for both codings $G_c$ is a complementary Gauss function with:

$$G_c(x) := \int_x^\infty \frac{1}{\sqrt{2\pi}} e^{-x'^2/2} dx'$$

and for the 2B1Q modulation M is the moment number with M=4 for 2B1Q, while for the CAP modulation M is the constellation magnitude M×M. T is, as above, the symbol interval or half the inverse of the Nyquist frequency. For ADSL modems with DMT modulation, the dependency is different. As mentioned, ADSL has a variable bit rate. This displays itself likewise in $M_c$. Applicable is:

$$M_c = x_{ref} \frac{2\left(\int \log_2\left(1 + \frac{\xi(f)}{x_{ref}\Gamma}\right) df\right)/\Delta f - 1}{2^{D/\Delta f} - 1}$$

whereby $\xi(f)$ is the signal-to-noise ration $S(f)/N(f)$. $x_{ref}$ is a reference margin which in this embodiment example has been typically selected as 6 dB, i. e. $x_{ref}=10^{0.6}$. Other values for reference margins are conceivable, however. $\Delta f$ is the entire frequency width or respectively the entire frequency band used for the transmission. The integration is executed via the frequency. D is the bit rate, for instance in b/s (bits/seconds). $\Gamma$ is a correction factor. In this embodiment example $\Gamma$ is situated for instance at $\Gamma=9.55$. The integration is carried out in this embodiment example via the frequency f. Analogously, it can also be carried out over time or another physical value, the formula above having to then be adapted accordingly.

In general, the data transfer margins obtained such as above do not correspond to experiment. Therefore the calculating unit 30 determines the actual data transfer margins by means of at least one correction factor based on the stored data transfer margins. The correction factor for this embodiment example has been selected such that a sufficient correspondence is achieved between the obtained data transfer margins and the actual data transfer margins. Assumed to be sufficient here was e.g. +/−3 dB, other values also being conceivable, however. To achieve this maximal deviation of +/−3 dB, two parameters are determined. $M_{imp}$ takes into account the good or poor implementation of a modem by the manufacturer. $M_{imp}$ was introduced based on the fact that same modems with comparable hardware and same data transmission modulations and /or modulation codings, but however from different manufacturers, deliver different results during translation of the analog signal into a digital signal and vice-versa, which affects their maximal bit rate or their maximal range for a particular network connection. This must be corrected for the data transfer margins. Introduced as the second parameter was $N_{int}$. $N_{int}$ takes into account the quantization noise in the modem (analog-to-digital conversion), as well as a possible poor adaptation of the equalizer during the transmission. If a transmission takes place between a transmitter 10 and a receiver 11, the equalizer in the modem adapts the transmission rate to the conditions of the network connection such as e.g. the line attenuation, phase distortion, etc. by means of a training sequence, which are <sic. is> sent back and forth between the two communicating modems. A poor adaptation by the equalizer leads to a distortion of the results and must be corrected. For linear equalizers, the following formula can be used, for example:

$$SNR_{LinearEq} = \left(T\int_{-1/2T}^{1/2T} \frac{df}{X_s(f)}\right)^{-1} \text{ with}$$

$$X_s(f) = \sum_n \frac{|S_e(f+n/T)|^2}{N_e(f+n/T)} + 1$$

whereby $SNR_{linearEq}$ is the signal-to-noise ratio, $S_e$ the signal which the equalizer receives, $N_e$ the noise and $f$ the frequency. For a Decision Feedback Equalizer (DFE), the following formula can be used:

$$SNR_{DFE} = \exp\left(T\int_{-1/2T}^{1/2T} \ln(X_s(f))df\right) \text{ with}$$

$$X_s(f) = \sum_n \frac{|S_e(f+n/T)|^2}{N_e(f+n/T)} + 1$$

whereby again $SNR_{linearEq}$ is the signal-to-noise ratio, $S_e$ is, as above, the signal which the equalizer receives, $N_e$ the noise and $f$ the frequency. For determination of the $SNR_{DFE}$, the calculating unit 30 can use e.g. the following approximation:

$$SNR_{DFE} \cong \exp\left(T\int_{-1/2T}^{1/2T} \ln\left(\frac{\sum_n |S_e(f+n/T)|^2}{\sum_n N_e(f+n/T)}\right)df\right)$$

Thus it follows for the actual data margins: $S(f) = PSD_{Modem}(f)H^2(f,L,D)$ as previously. The noise is corrected as follows:

$$N(f) = \sum_i PSD_{SModem(i)}(f) \cdot Hxp^2(f, L, D, xtalktype_i, n_i) + N_{int}$$

In the calculating unit 30 the correction can be implemented in a module using hardware or software. It is important to point out that with such a module, based on the correction $N_{int}$, a variable noise factor is introduced which can take into consideration, for example, equalizer harmonization, etc. This cannot be found as such in the state of the art, and is among the substantial advantages of the invention, among other things. The actual data transfer margins $M_{eff}$ become <have been given> through $M_{eff}=M_c-M_{imp}$, which is taken into account in addition to $N_{int}$ as mentioned above. The correct values for $M_c$ and $N_{int}$ can be obtained by the calculating unit 30 in the comparison with experimental data. Typically the calculating unit 30 must have access for this purpose to data from various experiments in order to be able to determine the parameters correctly within the desired deviation. By means of the correction factors, which therefore comprise an average deviation of the stored data transfer margins with respect to the actual data transfer margins, the actual data transfer margins described above are determined and stored, likewise assigned to the respective physical lengths L 13 and cable wire thicknesses D 141, 142, 143, 144 of the network connection 12, on a data carrier of the calculating unit 30. It is to be pointed out that the correction factors do not necessarily have to be linear factors, i.e. constants, but can also just as well comprise instead correction functions with a non-linear dependency. Depending upon the application, more complex deviations of the experimental data can thereby also be taken into account. Finally, by means of the stored matrices with the data transfer margins, the calculating unit 30 determines the data transfer margin for a particular network connection 12 based on the stored actual transfer margins with reference to the known physical length 13 of the network connection 12 to be determined between the transmitter 10 and the receiver 11. As mentioned several times, the data transfer margins are indicated in dB. The modem runs typically for values >0 dB, while for values <0 dB it does not run. To guarantee a good, secure operation, it can make sense to select e.g. 6 dB as lower limit. In general, other data transfer margins are also suitable as lower limit, however, e.g. values between 3 dB and 9 dB. As follows from the above indications, instead of matrices with data transfer margins, correspondingly matrices with bit rates for various network connections, e.g. for a data transfer margin of 6 dB, can be determined for ADSL modems, by means of the same configuration. Thus it follows for determining the matrices with bit rates 6 dB=$M_{eff}$. In the case of the HDSL modems, this does not make any sense insofar as the codings with HDSL, such as e.g. 2B1Q or CAP, work with a constant bit rate, here e.g. 2.048 Mb/s. The reason for this difference with respect to the ADSL modems is that HDSL systems are only designed for a point of access with higher bit rate, and concern only security (SNR).

Figure 3:
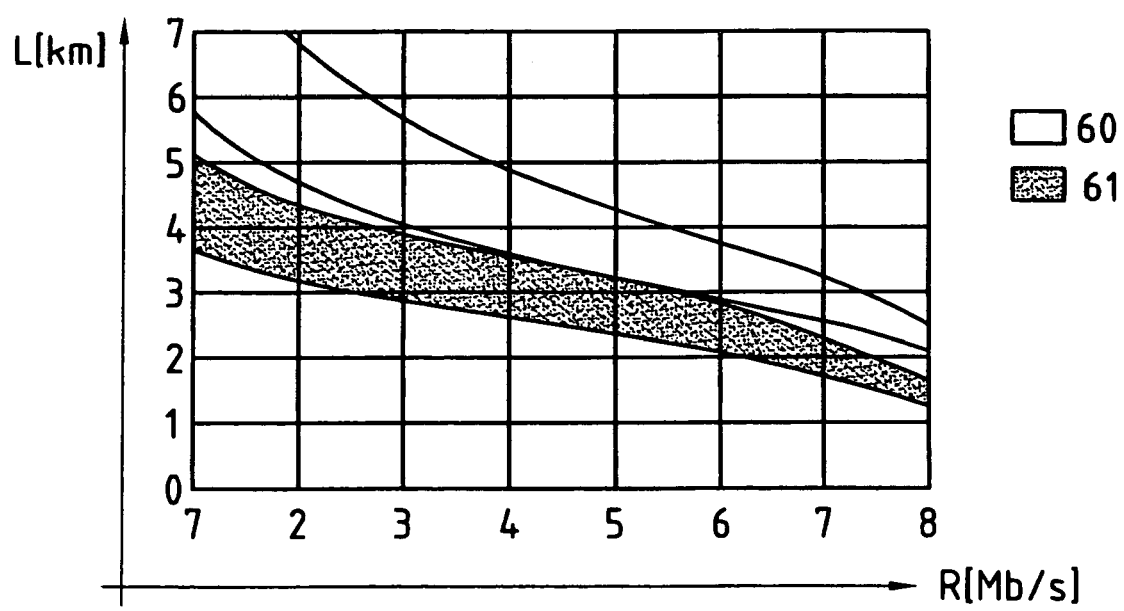
FIG. 3 shows schematically the transmission distance of the network connection in dependence upon the transmission rates (bit rates) for ADSL modems, as can be obtained with the system according to the invention. The reference numerals 60 and 61 thereby designate different noise environments.

FIG. 3 shows the transmission distance of the network connection in dependence upon the transmission rate (bit rate) for ADSL modems. The reference numerals 60 and 61 thereby designate different noise environments. As described above, the bit rates have been shown based on the stored matrices or respectively lists.

What is claimed is:

1. A method for determining data transfer margins for network connections, a physical length of a network connection to be determined between a transmitter and a receiver being known, comprising:

measuring a power spectrum by a power measuring device in dependence upon a transfer frequency for possible modem types, and transmitting the measured power spectrum onto a data carrier of a calculating unit;

determining, with the calculating unit, attenuation for different physical lengths and cable wire thicknesses of the network connection, and storing actual signal strengths at the receiver, based on the attenuation and the measured power spectrum, assigned to the respective physical lengths and cable wire thicknesses, into a first list on the data carrier of the calculating unit;

storing, in a second list, noise level, assigned to the respective physical lengths and cable wire thicknesses of the network connection, on the data carrier of the calculating unit, the noise level being determined by the calculating unit based on the power spectrum, depending upon at least crosstalk parameters and number of interference sources;

determining, by a Gaussian transformation module, in the calculating unit, data transfer margins for a predefined bit rate based on the actual signal strengths of the first list and corresponding noise level of the second list for different data transmission modulations and/or modulation codings, and storing the data transfer margins, assigned to the respective physical lengths and cable wire thicknesses of the network connection, on the data carrier of the calculating unit;

determining, in the calculating unit, based on the stored data transfer margins, the actual data transfer margins by at least one correction factor and storing the actual data transfer margins, assigned to the respective physical lengths and cable wire thicknesses of the network connection, on the data carrier of the calculating unit, the correction factor comprising an average deviation of the stored data transfer margins with respect to the actual data transfer margins and/or an equalizer factor for correction of equalizer adjustment; and determining, based on the stored actual data transfer margins, with reference to the known physical length of the network connection to be determined between the transmitter and the receiver, in the calculating unit, the data transfer margin for the respective network connection.

2. A method according to claim 1, wherein the correction factor reflects a non-linear dependency with respect to the physical lengths and/or cable wire thicknesses.

3. A method according to claim 1, wherein the power spectrum is measured in dependence upon transmission frequency for ADSL, and/or SDSL, and/or HDSL, and/or VDSL modem types.

4. A method according to claim 3, wherein the SDSL modem types comprise at least one G.991.2 modem type, and/or the ADSL modem types comprise at least one G.992.2 modem type.

5. A method according to claim 1, wherein by the Gaussian transformation module the data transfer margins are calculated for at least the data transmission modulations 2B1Q, and/or CAP, and/or DMT, and/or PAM.

6. A method according to claim 1, wherein the data transfer margins are determined for at least trellis modulation coding by the Gaussian transformation module.

7. A computer program product, configured to be loaded directly into an internal memory of a digital computer and comprising software code sections with which operations according to claim 1 are able to be executed when the product runs on a computer.

8. A method for determining bit rates for network connections, a physical length of a network connection between a transmitter and a receiver being known, comprising:

measuring a power spectrum by a power measuring device in dependence upon transfer frequency for possible modem types and transmitting the measured power spectrum onto a data carrier of a calculating unit;

determining, with the calculating unit, attenuation for different physical lengths and cable wire thicknesses of the network connection, and storing actual signal strengths at the receiver, based on the attenuation and the measured power spectrum, assigned to the respective physical lengths and cable wire thicknesses, in a first list on the data carrier of the calculating unit;

storing, in a second list, noise level, assigned to the respective physical lengths and cable wire thicknesses of the network connection, on the data carrier of the calculating unit, the noise level being determined based on the measured power spectrum by the calculating unit depending upon at least crosstalk parameters and number of interference sources;

determining, by a Gaussian transformation module, based on the actual signal strengths of the first list and corresponding noise level of the second list for different data transmission modulations and/or modulation codings, in the calculating unit, bit rates for a predefined data transfer margin, and storing the bit rates, assigned to the respective physical lengths and cable wire thicknesses of the network connection, on the data carrier of the calculating unit;

determining, in the calculating unit, based on the stored bit rates, the actual bit rates by a correction factor, and storing the actual bit rates, assigned to the respective physical lengths and cable wire thicknesses of the network connection, on the data carrier of the calculating unit, the correction factor comprising an average deviation of the stored bit rates with respect to the actual bit rates and/or an equalizer factor for correction of equalizer adjustment; and determining, based on the stored actual bit rates, with reference to the known physical length of the network connection to be determined between the transmitter and the receiver, in the calculating unit, the bit rate for the respective network connection.

9. A method according to claim 8, wherein by the Gaussian transformation module the bit rates are determined for a data transfer margin between 3 and 9 dB.

10. A method according to claim 8, wherein by the Gaussian transformation module the bit rates are determined for a 6 dB data transfer margin.

11. A method according to claim 8, wherein the correction factor reflects a non-linear dependency with respect to the physical lengths and/or cable wire thicknesses.

12. A method according to claim 8, wherein the power spectrum is measured in dependence upon transmission frequency for ADSL, and/or SDSL, and/or HDSL, and/or VDSL modem types.

13. A method according to claim 12, wherein the SDSL modem types comprise at least one G.991.2 modem type, and/or the ADSL modem types comprise at least one G.992.2 modem type.

14. A method according to claim 8, wherein by the Gaussian transformation module the bit rates are determined for at least the data transmission modulations 2B1Q, and/or CAP, and/or DMT, and/or PAM.

15. A method according to claim 8, wherein by the Gaussian transformation module the bit rates are determined for at least trellis modulation coding.

16. A computer program product, configured to be loaded directly into an internal memory of a digital computer and comprising software code sections with which the operating according to claim 8 are executed when the product runs on a computer.

17. A system for determining data transfer margins for network connections, a physical length of a network connection to be determined between a transmitter and a receiver being known, comprising:
 a measuring device configured to measure a power spectrum in dependence upon transmission frequency for possible modem types;
 a data carrier of a calculating unit, on which the power spectrum is storable;
 wherein the calculating unit comprises means for determining attenuation for different physical lengths and cable wire thicknesses of the network connection, the actual signal strengths at the receiver, based on the attenuation as well as the power spectrum, being stored, assigned to the respective physical lengths and cable wire thicknesses, in a first list on the data carrier of the calculating unit;
 wherein the calculating unit comprises means for determining noise level, based on the measured power spectrum, depending upon at least crosstalk parameters and number of interference sources, the noise level being stored, assigned to the respective physical lengths and cable wire thicknesses of the network connection, in a second list on the data carrier of the calculating unit;
 wherein the calculating unit comprises a Gaussian transformation module configured to determine data transfer margins for a predefined bit rate based on the actual signal strengths of the first list and corresponding noise levels of the second list for different data transmission modulations and/or modulation codings, the data transfer margins being stored, assigned to the respective physical lengths and cable wire thicknesses of the network connection, on the data carrier of the calculating unit;
 wherein the calculating unit comprises a correction module configured to determine, based on the stored data transfer margins, the actual data transfer margins by at least one correction factor, and to store the actual data transfer margins, assigned to the respective physical lengths and cable wire thicknesses of the network connection, on the data carrier of the calculating unit, the correction factor comprising an average deviation of the stored data transfer margins with respect to the actual data transfer margins and/or an equalizer factor for correction of equalizer adjustment.

* * * * *

UNITED STATES PATENT AND TRADEMARK OFFICE
CERTIFICATE OF CORRECTION

PATENT NO. : 7,388,945 B2 Page 1 of 1
APPLICATION NO. : 10/495826
DATED : June 17, 2008
INVENTOR(S) : Pythoud It is certified that error appears in the above-identified patent and that said Letters Patent is hereby corrected as shown below:

On the title page, Item (73), the Assignee country code is incorrect. Item (73) should read:

-- (73) Assignee: Swisscom Fixnet AG, Bern (CH) --

Signed and Sealed this

Twenty-sixth Day of August, 2008

JON W. DUDAS
*Director of the United States Patent and Trademark Office*